(12) United States Patent
Hardy et al.

(10) Patent No.: US 8,872,119 B2
(45) Date of Patent: Oct. 28, 2014

(54) CERAMIC SCINTILLATOR BODY AND SCINTILLATION DEVICE

(75) Inventors: Anne B. Hardy, Paris (FR); Qiwei Chen, Shanghai (CN); Xiaofeng Peng, Shanghai (CN); Nathalie Petigny, Velleron (FR); Bruno Viana, Montegeron (FR); Andrée Kahn-Harari, Paris (FR)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 283 days.

(21) Appl. No.: 13/142,705

(22) PCT Filed: Dec. 24, 2009

(86) PCT No.: PCT/US2009/069532
§ 371 (c)(1),
(2), (4) Date: Sep. 23, 2011

(87) PCT Pub. No.: WO2010/078220
PCT Pub. Date: Jul. 8, 2010

(65) Prior Publication Data
US 2012/0001074 A1      Jan. 5, 2012

Related U.S. Application Data (60) Provisional application No. 61/141,577, filed on Dec. 30, 2008.

(51) Int. Cl.
| | |
|---|---|
| G01T 1/20 | (2006.01) |
| C09K 11/08 | (2006.01) |
| C09K 11/66 | (2006.01) |
| C09K 11/02 | (2006.01) |
| G21K 4/00 | (2006.01) |
| C09K 11/77 | (2006.01) |

(52) U.S. Cl.
CPC .............. *G21K 4/00* (2013.01); *C09K 11/7769* (2013.01); *C09K 11/7701* (2013.01); *G21K 2004/06* (2013.01)

USPC .............. 250/370.11; 250/361 R; 250/484.4; 252/301.4 F; 252/301.4 R; 252/301.4 H; 423/263; 423/593.1; 501/152; 264/21

(58) Field of Classification Search
USPC .................... 250/361 R, 370.11; 252/301.4 F
See application file for complete search history.

(56) References Cited

U.S. PATENT DOCUMENTS

| | | |
|---|---|---|
| 4,421,671 A | 12/1983 | Cusano et al. |
| 4,465,929 A | 8/1984 | Greskovich et al. |

(Continued)

FOREIGN PATENT DOCUMENTS

| | | |
|---|---|---|
| CN | 200410053427 A | 8/2004 |
| CN | 200410053428 | 8/2004 |

(Continued)

OTHER PUBLICATIONS

Pieter Dorenbos, Directions in Scintillation Materials Research, 2006, Springer—NATO Security Through Science Series 2006—Radiation Detectors for Medical Applications, pp. 191-207.*

(Continued)

*Primary Examiner* — David Porta
*Assistant Examiner* — Jeremy S Valentiner
(74) *Attorney, Agent, or Firm* — Abel Law Group, LLP; Robert N. Young (57) ABSTRACT

A scintillation device includes a free-standing ceramic scintillator body that includes a polycrystalline ceramic scintillating material comprising a rare earth element, wherein the polycrystalline ceramic scintillating material is characterized substantially by a cation-deficient perovskite structure. A method of producing a free-standing ceramic scintillator body includes preparing a precursor solution including a rare earth element precursor, a hafnium precursor and an activator (Ac) precursor, obtaining a precipitate from the solution, and calcining the precipitate to obtain a polycrystalline ceramic scintillating material including a rare earth hafnate doped with the activator and having a cation-deficient perovskite structure.

16 Claims, 4 Drawing Sheets

(56) References Cited

U.S. PATENT DOCUMENTS

| | | | |
|---|---|---|---|
| 4,473,513 | A | 9/1984 | Cusano et al. |
| 4,518,545 | A | 5/1985 | Cusano et al. |
| 4,518,546 | A | 5/1985 | Greskovich et al. |
| 4,525,628 | A | 6/1985 | DiBianca et al. |
| 4,571,312 | A | 2/1986 | Greskovich et al. |
| 4,747,973 | A | 5/1988 | Cusano et al. |
| 4,980,560 | A | 12/1990 | Bryan et al. |
| 5,116,559 | A | 5/1992 | Dole et al. |
| 5,116,560 | A | 5/1992 | Dole et al. |
| 5,213,712 | A | 5/1993 | Dole |
| 5,296,163 | A | 3/1994 | Leppert et al. |
| 5,318,722 | A | 6/1994 | Tsoukala et al. |
| 5,484,750 | A | 1/1996 | Greskovich et al. |
| 5,521,387 | A * | 5/1996 | Riedner et al. ............. 250/367 |
| 5,562,860 | A | 10/1996 | Grabmaier et al. |
| 5,640,016 | A | 6/1997 | Matsuda et al. |
| 5,676,891 | A | 10/1997 | Boedinger |
| 5,882,547 | A | 3/1999 | Lynch et al. |
| 6,093,347 | A | 7/2000 | Lynch et al. |
| 6,197,719 | B1 | 3/2001 | Choudhary et al. |
| 6,323,489 | B1 | 11/2001 | McClellan |
| 6,340,436 | B1 | 1/2002 | Yamada et al. |
| 6,384,417 | B1 | 5/2002 | Okumura et al. |
| 6,504,156 | B1 | 1/2003 | Takahara et al. |
| 6,822,240 | B2 | 11/2004 | Francke et al. |
| 6,967,330 | B1 | 11/2005 | Lempicki et al. |
| 7,329,370 | B2 | 2/2008 | Kim et al. |
| 7,531,109 | B2 | 5/2009 | LaCourse et al. |
| 2001/0028700 | A1 | 10/2001 | Duclos et al. |
| 2002/0013215 | A1 | 1/2002 | Nakamura |
| 2003/0183806 | A1 * | 10/2003 | Lyons ............... 252/301.4 F |
| 2003/0193040 | A1 | 10/2003 | Venkataramani et al. |
| 2005/0087724 | A1 | 4/2005 | Kim et al. |
| 2007/0114447 | A1 * | 5/2007 | Shoji et al. ............. 250/483.1 |
| 2007/0131908 | A1 * | 6/2007 | Krishna et al. ......... 252/301.4 R |
| 2007/0237668 | A1 * | 10/2007 | Martins Loureiro et al. ... 419/48 |
| 2007/0292330 | A1 | 12/2007 | Kurata et al. |
| 2008/0025895 | A1 | 1/2008 | Hosokawa et al. |
| 2008/0103325 | A1 * | 5/2008 | Lugmair et al. ............. 558/321 |
| 2008/0128623 | A1 | 6/2008 | Srivastava |
| 2009/0189121 | A1 | 7/2009 | LaCourse et al. |
| 2009/0309032 | A1 * | 12/2009 | Ramsden et al. ......... 250/370.1 |
| 2012/0012787 | A1 | 1/2012 | LaCourse et al. |
| 2012/0049118 | A1 | 3/2012 | LaCourse et al. |
| 2012/0085972 | A1 | 4/2012 | LaCourse et al. |

FOREIGN PATENT DOCUMENTS

| | | |
|---|---|---|
| CN | 200510025813 A | 5/2005 |
| CN | 1982259 A | 6/2007 |
| CN | 101265098 A | 9/2008 |
| CN | 101270283 A | 9/2008 |
| CN | 20081011236 A | 9/2008 |
| EP | 0166566 A2 | 1/1986 |
| EP | 0097300 B1 | 6/1988 |
| EP | 0297269 A1 | 1/1989 |
| EP | 0419847 A1 | 4/1991 |
| EP | 1028154 A1 | 8/2000 |
| JP | 59030883 A | 2/1984 |
| JP | 6438491 A | 2/1989 |
| JP | 1242456 A | 9/1989 |
| JP | 2073902 A | 3/1990 |
| JP | 2213403 A | 8/1990 |
| JP | 11029767 A | 2/1999 |
| JP | 11315278 A | 11/1999 |
| JP | 2002275465 A | 9/2002 |
| WO | 2005028591 A1 | 3/2005 |
| WO | 2005110943 A1 | 11/2005 |
| WO | WO 2008015382 A2 * | 2/2008 |

OTHER PUBLICATIONS

R. Babu et al., "Calorimetric measurements on rare earth pyrohafnates RE2HI2O7 (RE=La,EuGd)," Elsevier, Journal of Alloys and Compounds, 265 (1998), Received Jun. 7, 1997; received in revised form Jul. 21, 1997, pp. 137-139.

The International Search Report and the Written Opinion for International Application No. PCT/US2009/089532 received from the International Searching Authority (ISA/KR), dated Aug. 17, 2010, 10 pages.

The International Search Report and the Written Opinion for International Application No. PCT/US2009/069533 received from the International Searching Authority (ISA/KR), dated Aug. 13, 2010, 10 pages.

The International Search Report and the Written Opinion for International Application No. PCT/US2009/069538 received from the International Searching Authority (ISA/KR), dated Jul. 30, 2010, 10 pages.

The International Search Report and the Written Opinion for International Application No. PCT/US2009/069539 received from the International Searching Authority (ISA/KR), dated Jul. 16, 2010, 8 pages.

C. Greskovich et al., "Ceramic Scintillators," Annual Reviews Inc., General Electric Coporate Research and Development, Ceramics Laboratory, Niskayuna, New York, Annu. Rev. Mater. Sci. 27, 1997, pp. 69-88.

David J. Krus et al., "Preision linear and two-dimensional scintillation crystal arrays for x-ray and gamma ray imaging applications," Bicron, a division of Saint-Gobain Industrial Ceramics, Inc., Presented at the SPIE International Synosium on Optical Science, Engineering and Instrumentation, dated Jul. 18-23, 1999, Hard-X-Ray, Gamma-Ray and Neutron Detector Physics (SPIE vol. 3768), 12 pages.

C. De Mello Donega et al., "Non-Radiative Relaxation Processes of the Pr3+ Ion in Solids," Pergamon, J. Phys. Chem. Solids vol. 56, No. 5, Elesvier Science Ltd., Received Jun. 30, 1994, Accepted Oct. 13, 1994, pp. 673-685.

Frank Schrey, "Effect of pH on the Chemical Preparation of Barium—Strontium Titanate," Journal of the American Ceramic Society, vol. 48: No. 8, Bell Telephone Laboratories, Inc., Murray Hill, New Jersey, dated Aug. 1965, 5 pages.

G.Z. Li et al., "Sol-Gel Fabrication and Photoluminescence Properties of SiO2 © Gd2O3:Eu3+ Core-Shell Particles," Journal of Nanoscience and Nanotechnology: A Special Issue on SWCNT Growth Mechanisms, vol. 6, No. 5, <www.aspbs.com/jnn>, American Scientific Publishers, dated May 2006, 8 pages.

H. Morkoc et al., "Large-band-gap SiC, III-V nitride, and II-VI ZnSe-based semiconductor device technologies," American Institute of Physics, J. App. Phys. 73 (3), dated Aug. 1, 1994, downloaded Jan. 27, 2005, 36 pages.

E.A. Ivanova et al., "Synthesis of Low-Agglomerated Nanoprecursors in the ZrO2—HfO2—Y2—O3 System," Advanced Study Center Co. Ltd., Rev.Adv.Mater.Sci. 10 (2005), Received Jun. 17, 2005, pp. 357-361.

Y M. Ji et al., "Structure and luminescence of HfO2-codoped Gd2O3:Eu phosphors," Shanghai Institute of Ceramics, Chinese Academy of Sciences,Shanghai, PR China, Elsevier, Journal of Luminescence, 122-123 (2007), Available online Mar. 20, 2006, pp. 984-986.

Paul Lecoq et al., "New Inorganic Scintillation Materials Development for Medical Imaging," IEEE Transaction on Nuclear Science, vol. 49, No. 4, dated Aug. 2002 4 pages.

L.H. Brixner, "Structural and Luminescent Properties of the Ln2Hf2O7-Type Rare Earth Hafnates," Mat. Res. Bull., vol. 19, No. 2, dated 1984, pp. 143-149.

V.V. Nagarkar et al., "Structured LiI Scintillator for Thermal Neutron Imaging," IEEE Transactions on Nuclear Science, vol. 46, No. 6, dated Dec. 2001, 5 pages.

V. Pelova et al., "Luminescence of Y2O3: Eu and Gd2O3: Eu Depending on Precursor and Activation Temperature," Crystal Research Technology, 33, dated 1998, 1, pp. 125-128.

Richard A. Swalin, "Thermodynamics of Solids," University of Minnesota, John Wiley & Sons, Inc., dated 1912, 5 pages.

Arhtur L. Robinson, "A Chemical Route to Advanced Ceramics," American Association for the Advancement of Science, <http://

(56) References Cited

OTHER PUBLICATIONS www.jstor.org/stable/1697490>, Science, New Series, vol. 233, No. 4759 (Jul. 4, 1986), Accessed Sep. 30, 2011, 4 pages.

Christopher R. Stanek et al., "Prediction of Rare-earth $A_2Hf_2O_7$ Pyrochlore Phases," Communications of the American Ceramic Society, vol. 85, No. 8, Manuscript No. 187131, Presented at the 104th Annual meeting of the American Ceramic Society, dated Aug. 2002, 3 pages.

N. Teneze et al., "Cation-deficient perovskite-related compounds $(Ba, La)_nTi_{n-1}O_{3n}$ (n=4, 5, and 6): a Rietveld refinement from neutron powder diffraction data," Pergamon, Materials Research Bulletin, 35, dated 2000, 12 pages.

Shunkichi Ueno et al., "High Temperature Water Vapor Corrosion Behavior of Titanium Aluminate ($al2TiO5$), Synergy Materials Research Center, National Institute of Advanced Industrial Science and Technology, Journal of the Ceramic Society of Japan," 111 [11], dated 2003, pp. 860-862.

Yaming Ji et al., "$LaHf_2O_7:Ti^{4+}$ ceramic scintillator for x-ray imaging," Shanghai Institute of Ceramics, Chinese Academy of Sciences, Materials Research Society, J. Mater, Res., vol. 20, No. 3, dated Mar. 2005, 4 pages.

Ya-Ming Ji et al., "Preparation and spectroscopic properties of $La_2Hf_2O_7:Tb$" R&D Center of Shanghai Institute of ceramics, Chinese Academy of Sciences, Shanghai, PR of China, Elsevier, Materials Letters, 59, dated 2005; pp. 868-871.

Yaming Ji et al., "Fabrication of transparent $La_2Hf_2O_7$ ceramics from combustion synthesized powders," R&D Center of Shanghai Institute of Ceramics, Chinese Academy of Sciences, Shanghai, PR China, Elsevier, Material Research Bulletin, 40, dated 2005, pp. 553-559.

Lubomir Havlak et al., "Preparation and luminescence of $Lu_4Hf_3O_{12}$ powder samples doped by trivalent Eu, Tb, Ce, Pr, Bi ions," Institute of Physics AS CR, Prague & Czech Republic, Elsevier, Optical Materials, 32; dated 2010; pp. 1372-1374.

Zelia Soares Macedo et al., "Laser-Sintered Bismuth Germanate Ceramics as Scintillator Devices," Journal of the American Ceramic Society, vol. 87, No. 6, dated Jun. 2004, pp. 1076-1081.

M Nikl, "Wide Band Gap Scintillation Materials: Progress in the Technology and Material Understanding," Institute of Physics, Academy of Sciences of the Czech Republic, Czech Republic, Phys. Stat. Sol. (a) 178, 595, dated 2000, 26 pages.

\* cited by examiner

CERAMIC SCINTILLATOR BODY AND SCINTILLATION DEVICE

CROSS-REFERENCE TO RELATED APPLICATIONS

The present application claims priority to PCT Application No. PCT/US09/69532, filed Dec. 24, 2009, entitled "SCINTILLATION DEVICE AND METHOD OF PRODUCING A CERAMIC SCINTILLATOR BODY," by Anne B. Hardy et al., which in turn claims priority to U.S. Provisional Application No. 61/141,577 filed Dec. 30, 2008, entitled "SCINTILLATION DEVICE AND METHOD OF PRODUCING A CERAMIC SCINTILLATOR BODY," by Anne B. Hardy et al., all of which are all incorporated by reference herein in their entireties.

FIELD OF THE DISCLOSURE

The present disclosure is directed to scintillation devices, particularly scintillation devices for industrial applications, and to ceramic scintillator bodies.

BACKGROUND

Scintillation devices are used in a variety of industrial applications. For example, scintillation devices are used for well logging in the oil and gas industry and for imaging scans in the medical field. Typically, scintillation devices include scintillator bodies, such as a scintillator crystal, produced from a material that is effective to detect gamma rays, x-rays, ultraviolet radiation or other radiation. The scintillator bodies can absorb x-rays or other radiation and emit light. The emitted light can sometimes be recorded on film. Generally, the scintillator bodies are enclosed in casings or sleeves that include a window to permit radiation-induced scintillation light to pass out of the crystal package. The light passes to a light-sensing device such as a photomultiplier tube, a photodiode or another photosensor that converts the light emitted from the scintillator body into electrical pulses. In other applications, multiple scintillator bodies can be used in imaging arrays for medical imaging equipment.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Numerous innovative teachings of the present application will be described with particular reference to exemplary embodiments. However, it should be understood that this class of embodiments provides only a few examples of the many advantageous uses of the innovative teachings herein. In general, statements made in the specification of the present application do not necessarily limit any of the various claimed articles, systems or methods. Moreover, some statements may apply to some inventive features but not to others.

The demands of well logging and medical imaging benefit from scintillation devices that are accurate under harsh and fast conditions. Various classes of scintillating materials can be used to produce scintillator bodies depending on intended applications. For example, single crystal oxyorthosilicates, such as lutetium yttrium oxyorthosilicate (LYSO), are often used in medical imaging applications, such as positron emission tomography (PET). These materials are typically characterized by relatively high stopping power and fast decay times. Nonetheless, LYSO is often characterized by low light output, and performance in PET scan applications can suffer from electron emission resulting from the $\beta^-$ decay of lutetium.

Another class of scintillating materials includes ceramic rare earth sulfoxylates, such as gadolinium oxysulfide (GOS). Ceramic materials such as GOS can be less costly than single crystal materials, such as LYSO. However, the hexagonal structure of ceramic rare earth sulfoxylates often causes "birefringence," or light scattering at grain boundaries. As a result, such materials are less transparent and exhibit less light output or brightness than many single crystal materials. Consequently, improvements in scintillator efficiency and brightness that might be caused by the compatibility of ceramic rare earth sulfoxylates with certain activators are typically diminished by the reduced transparency that results from their hexagonal structures.

Yet another class of scintillating materials includes ceramic rare earth oxides, such as lutetium or yttrium oxides, or gadolinium lutetium oxide or gadolinium yttrium oxide. Cubic lattice structures give these materials a high degree of transparency, which increases their light output. Nonetheless, atomic distances in most ceramic rare earth oxides are shorter than ceramic rare earth sulfoxylates, for example, which causes non-radiative relaxation of some fast activators, such as cerium. Non-radiative relaxation reduces scintillator efficiency, as the activator decays without emitting visible light. Hence, the shorter atomic distances of cubic ceramic rare earth oxides tend to diminish scintillator efficiency and brightness that might result from the transparency of such materials.

Figure 1:
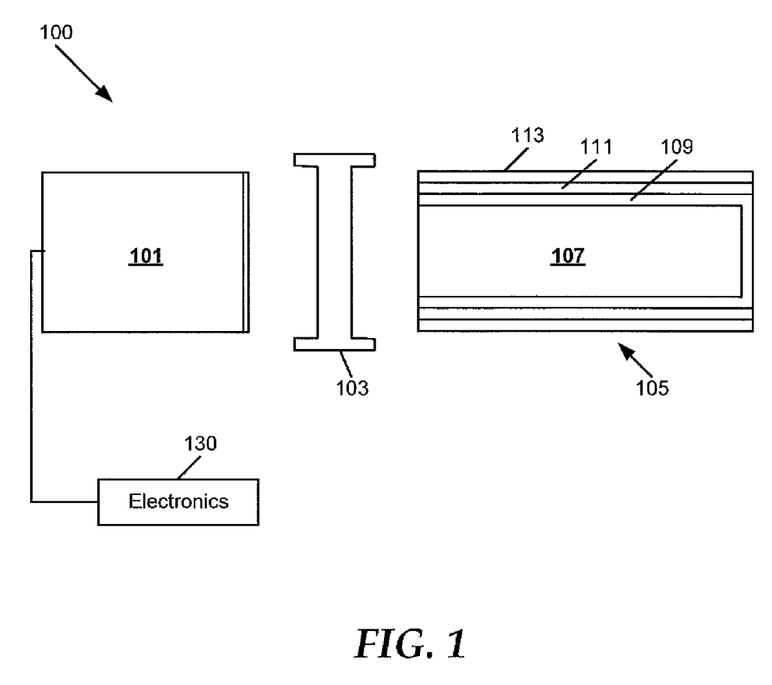
FIG. 1 is an illustration of a particular embodiment of a radiation detector device.

FIG. 1 shows a particular embodiment of a radiation detector device 100. The radiation detector device 100 includes a photosensor 101, a light pipe 103 and a scintillation device 105. Though the photosensor 101, the light pipe 103, and the scintillation device 105 are illustrated separately from each other, it is to be understood that the photosensor 101 and the scintillation device 105 are adapted to be coupled to each other via the light pipe 103.

In one embodiment, the photosensor 101 includes a device capable of spectral detection and resolution. For example, the photosensor 101 can comprise a conventional photomultiplier tube (PMT), a hybrid photodetector, or a photodiode. The photosensor 101 is adapted to receive photons emitted by the scintillation device 105 after absorbing x-rays or other radiation, and the photosensor 101 is adapted to produce electrical pulses or imaging signals from photons that it receives.

The electronics 130 can include one or more electronic devices, such as an amplifier, a pre-amplifier, a discriminator, an analog-to-digital signal converter, a photon counter, another electronic device, or any combination thereof. The photosensor 101 can be housed within a tube or housing made of a material capable of protecting electronics associated with the photosensor 101, such as a metal, metal alloy, other material, or any combination thereof.

As illustrated, the light pipe 103 is disposed between the photosensor 101 and the scintillation device 105 and facilitates optical coupling between the photosensor 101 and the scintillation device 105. In one embodiment, the light pipe 103 can include a quartz light pipe, plastic light pipe, or another light pipe. In another embodiment, the light pipe 103 can comprise a silicone rubber interface that optically couples an output window 119 of the scintillation device 105 with an input window of the photosensor 101. In some embodiments, multiple light pipes can be disposed between the photosensor 101 and the scintillation device 105.

The scintillation device 105 includes a scintillator body 107 housed within a casing 115. The scintillator body 107 can have various shapes, such as a rectangular shape, or a cylindrical surface including flat end faces. It will be appreciated that the surface finish of the scintillator body 107 can be sanded, polished, ground, etc., as desired.

The scintillator body 107 has a length that extends from a first end that is proximal to the photosensor 101 and a second end that is distal from the photosensor 101. The scintillation device 105 also includes a reflector 109 substantially surrounding the scintillator body 107. In addition, the scintillation device 105 can include a boot 111 that acts as a shock absorber to prevent damage to the scintillator body 107. The boot 111 can comprise a polymer, such as silicone rubber, another material, or a combination thereof Further, the scintillation device 105 can also include a casing 113.

In a particular embodiment, the scintillator body 107 is a ceramic scintillator body formed from a polycrystalline ceramic scintillating material that is characterized substantially by a cation-deficient perovskite crystallographic structure. The scintillator body 107 is free-standing, that is, a self-supporting, bulk body that is free of a supportive substrate, in contrast to a substrate bearing a scintillating film, for example.

The polycrystalline ceramic scintillating material is characterized by a chemical composition that can be represented by a general formula of $(RE)_n X_{n-1} O_{3n}$:Ac where RE represents the rare earth element. In one embodiment, n can be greater than or equal to 4. For example, the chemical composition can be represented by the general formula $(RE)_4 X_3 O_{12}$:Ac. In other examples, the chemical composition can be represented by other formulae corresponding to cation-deficient perovskite structures, such as the general formula $(RE)_5 X_4 O_{15}$:Ac.

According to one embodiment, the rare earth element can include a lanthanide element, such as lutetium. In an illustrative embodiment, RE represents a single rare earth element. In another illustrative embodiment, the polycrystalline ceramic scintillating material can include another rare earth element in addition to lutetium. In addition, the polycrystalline ceramic scintillating material includes a quatrovalent element, represented by X, such as hafnium. For instance, the scintillator body 107 can include a rare earth hafnate (or rare earth hafnium oxide) $((RE)_4 Hf_3 O_{12})$, such as lutetium hafnate $Lu_4 Hf_3 O_{12}$.

As represented in the general formula, the chemical composition of the polycrystalline ceramic scintillating material also includes an activator, Ac. The activator causes the scintillator body 107 to emit visible light after absorbing gamma radiation, x-rays, ultraviolet radiation or other radiation. The activator can include a rare earth element, such as a lanthanide element. For example, the activator can include cerium, europium, praseodymium, samarium, terbium, or ytterbium.

In another embodiment, the activator can include titanium. In an illustrative embodiment, the activator comprises less than or equal to approximately ten percent (10%) of the polycrystalline ceramic scintillating material, such as less than or equal to approximately five percent (5%) or less than or equal to approximately two percent (2%) of the polycrystalline ceramic scintillating material.

In an illustrative embodiment, the ceramic scintillator body 107 can be characterized by a grain size of from approximately 1 μm to approximately 100 μm. Additionally, the scintillator body 107 can also be characterized by a density of greater than 98%, such as greater than or equal to 99.9%, of theoretical density. In addition, the scintillator body 107 can be characterized by an optical transmittance of greater than fifty percent (50%) total transmission at a scintillator body thickness that stops greater than 98% of x-ray or other radiation at a wavelength of maximum emission. Moreover, the scintillator body 107 can be characterized by a decay time of less than 1 ms. The scintillator body 107 can also be characterized by a high stopping power, such as with an atomic number (eff Z) of greater than approximately 62, such as greater than or equal to 68.

Figure 2:
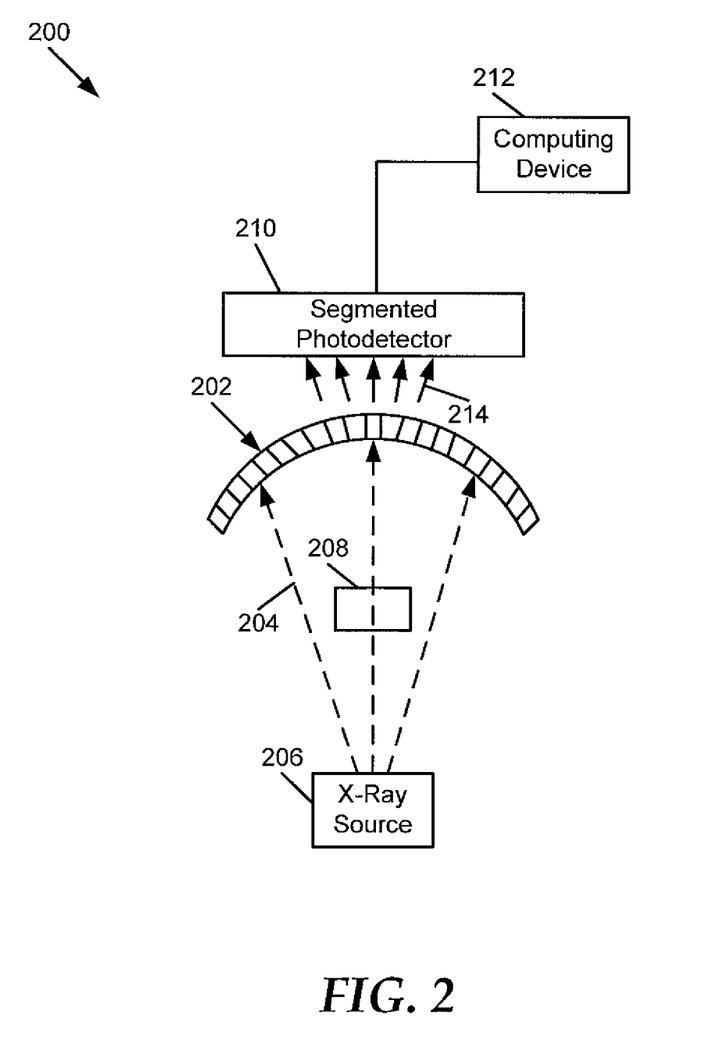
FIG. 2 is a block diagram illustrating a particular embodiment of x-ray computed tomography scanning equipment.

FIG. 2 illustrates a particular embodiment of x-ray scanning equipment 200, such as x-ray computed tomography (CT) equipment. The x-ray scanning equipment 200 includes an array 202 of scintillator devices, or pixels, and a segmented photodetector 210. The x-ray scanning equipment 200 also includes an x-ray source 206 adapted to emit x-rays 204, e.g., in a fan-shaped or cone-shaped pattern. The x-ray source 206 and the array 202 of scintillator devices may be adapted to rotate about an object 208. For example, the x-ray source 206 and the array 202 may be adapted to rotate opposite each other substantially along a circle centered about the object 208 and at substantially equal rates.

In a particular embodiment, each pixel in the array 202 includes a scintillator body. Each scintillator body is adapted to absorb x-rays 204 emitted by the x-ray source 206 and to emit scintillation light 214 that feeds into the segmented photodetector 210. The segmented photodetector 210 is adapted to measure scintillation light 214 received from each pixel and to determine from which pixel the particular scintillation light is received. The segmented photodetector 210 is adapted to produce signals based on the amount of scintillation light emitted by each pixel in the array 202 from various angles and to send the signals to the computing device 212. The computing device 212 is adapted to construct an image of the object 208 based on the signals received from the segmented photodetector 210.

Each pixel in the array 202 includes a free-standing, ceramic scintillator body formed from a polycrystalline ceramic scintillating material that is characterized substantially by a cation-deficient perovskite crystallographic structure. The polycrystalline ceramic scintillating material is characterized by a chemical composition that can be represented by a general formula of $(RE)_n X_{n-1} O_{3n}$:Ac where RE represents the rare earth element. In one embodiment, n can be greater than or equal to 4.

According to one embodiment, the rare earth element can include a lanthanide element, such as lutetium. In another illustrative embodiment, the polycrystalline ceramic scintillating material can include multiple rare earth elements, such as lutetium and another rare earth element. In addition, the polycrystalline ceramic scintillating material includes a quatrovalent element, represented by X, such as hafnium. For instance, each scintillator body in the array 202 can include a rare earth hafnate (or rare earth hafnium oxide) $((RE)_4 Hf_3 O_{12})$, such as lutetium hafnate $Lu_4 Hf_3 O_{12}$.

As represented in the general formula, the chemical composition of the polycrystalline ceramic scintillating material also includes an activator, Ac. The activator can include a rare earth element, such as a lanthanide element. For example, the activator can include cerium, europium, praseodymium, samarium, terbium, or ytterbium. In another embodiment, the activator can include titanium. In an illustrative embodiment, the activator comprises less than or equal to approximately ten percent (10%) of the polycrystalline ceramic scintillating material, such as less than or equal to approximately five percent (5%) or less than or equal to approximately two percent (2%) of the polycrystalline ceramic scintillating material.

In an illustrative embodiment, each scintillator body in the array 202 can be characterized by a grain size of from approximately 1 μm to approximately 100 μm. Additionally, each scintillator body in the array 202 can also be characterized by a density of greater than 98%, such as greater than or equal to 99.9%, of theoretical density. In addition, each scintillator body in the array 202 can be characterized by an optical transmittance of greater than fifty percent (50%). Moreover, each scintillator body in the array 202 can be characterized by a decay time of less than 1 ms. Each scintillator body in the array 202 can also be characterized by a high stopping power, such as with an atomic number (eff Z) of greater than approximately 62, such as greater than or equal to 68.

Figure 3:
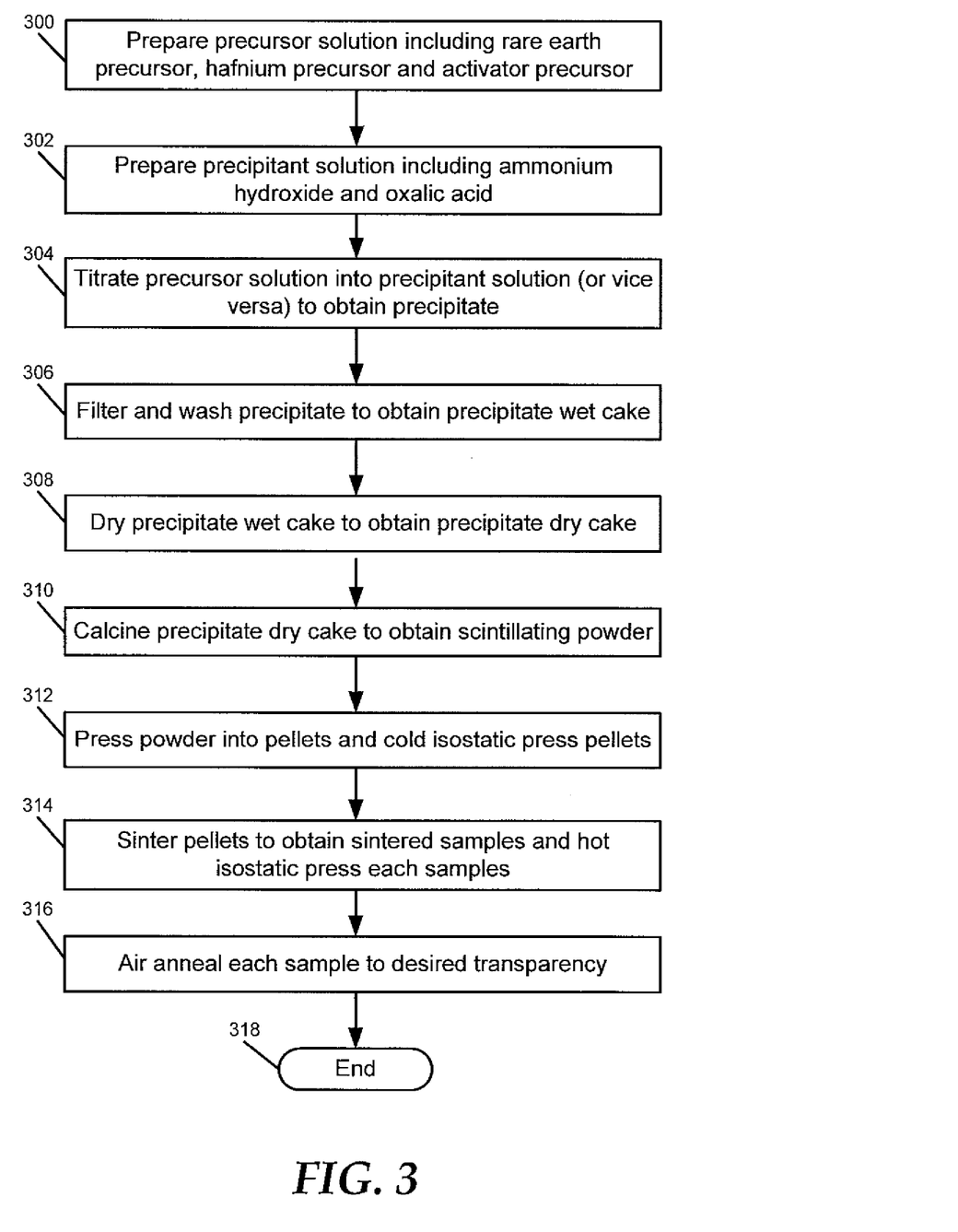
FIG. 3 is a flow diagram illustrating a particular embodiment of a method of producing a ceramic scintillator body.

FIG. 3 is a flow diagram illustrating a particular embodiment of a method of producing a ceramic scintillator body. At block 300, a precursor solution is prepared by mixing a rare earth element precursor with a hafnium precursor and an activator (Ac) precursor, such as a titanium precursor or another activator precursor. In an illustrative embodiment, the rare earth element precursor comprises a lutetium precursor, such as lutetium nitrate ($Lu(NO_3)_3$) or lutetium chloride ($LuCl_3$). The hafnium precursor comprises hafnium chloride ($HfCl_4$), hafnium nitrate ($Hf(NO_3)_4$) or a combination thereof.

Moving to block 302, a precipitant solution is prepared. The precipitant solution can include ammonium hydroxide ($NH_4OH$), ammonium bicarbonate ($NH_4HCO_3$), or a combination thereof. Alternatively, the precipitant solution can include oxalic acid ($H_2C_2O_4$). Proceeding to block 304, the precursor solution is titrated into the precipitant solution (or vice versa) to form a precipitate. In an illustrative embodiment, the solution can be covered after addition of the precursor solution and allowed to stand to allow the precipitate to settle. Continuing to block 306, the precipitate is filtered and washed, and a precipitate wet cake is obtained. For example, the precipitate can be washed using deionized water until a desired conductivity value of residual ions is reached. In another example, the precipitate can also be washed with ethanol to prevent agglomeration during drying.

Advancing to block 308, the precipitate wet cake is dried to obtain a precipitate dry cake. At block 310, the precipitate dry cake is calcined in air, argon or nitrogen, for example, to obtain a scintillating powder including a rare earth hafnate doped with the activator and having a cation-deficient perovskite structure. The polycrystalline ceramic scintillating material can be represented by a chemical composition of $(RE)_n Hf_{n-1}O_{3n}$:Ac, where n is greater than or equal to 4. For example, the polycrystalline ceramic scintillating material can be represented by a chemical composition of $Lu_4Hf_3O_{12}$:Ti.

Moving to block 312, the calcined powder can be formed into ceramic scintillator bodies by first die pressing the powder into pellets and then cold isostatic pressing the pellets. Proceeding to block 314, the pressed pellets are sintered to obtain sintered samples, and each sintered sample is hot isostatic pressed. Advancing to block 316, in a particular embodiment, each sample is air annealed to improve transparency. The method terminates at 318.

Figure 4:
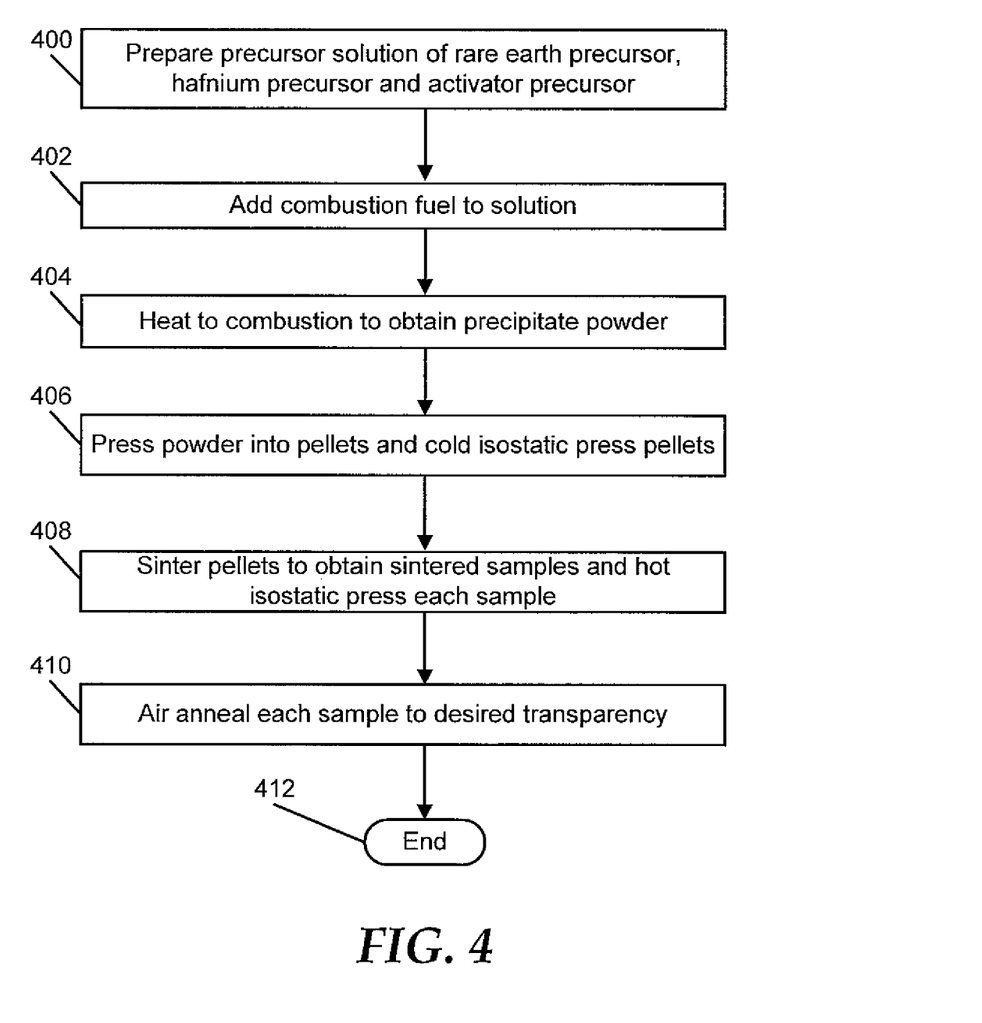
FIG. 4 is a flow diagram illustrating a second particular embodiment of a method of producing a ceramic scintillator body.

FIG. 4 is a flow diagram illustrating a second particular embodiment of a method of producing a ceramic scintillator body. At block 400, a precursor solution is prepared by mixing a rare earth element precursor with a hafnium precursor and an activator (Ac) precursor, such as a titanium precursor or another activator precursor. Moving to block 402, a combustion fuel is added to the solution. The combustion fuel can include, for example, glycerol, urea, hydrazine, a hydrocarbon, or any combination thereof.

Proceeding to block 404, the solution is heated to a heat of combustion to obtain a precipitate comprising a scintillating powder that includes a rare earth hafnate and the activator. In one embodiment, the precipitate can be calcined. In another embodiment, the scintillating powder can be obtained without calcining. The scintillating powder includes the rare earth hafnate doped with the activator and having a cation-deficient perovskite structure. In one embodiment, the polycrystalline ceramic scintillating material can be represented by a chemical composition of $(RE)_n Hf_{n-1}O_{3n}$:Ac, where n is greater than or equal to 4. For example, the polycrystalline ceramic scintillating material can be represented by a chemical composition of $Lu_4Hf_3O_{12}$:Ti.

Moving to block 406, the powder can be formed into ceramic scintillator bodies by first die pressing the powder into pellets and then cold isostatic pressing the pellets. Proceeding to block 408, the pressed pellets are sintered to obtain sintered samples, and the sintered samples are hot isostatic pressed. Advancing to block 410, in a particular embodiment, the samples are air annealed to improve transparency. The method terminates at 412.

EXAMPLE

In one example, a precursor solution was prepared using lutetium nitrate solution (63.6% lutetium nitrate, 36.4% water) as a rare earth element precursor. A hafnium precursor was prepared from dry hafnium dichloride oxide ($HfOCl_2$) crystals at a concentration of 0.1 M. Titanium nitrate was used for the activator precursor. Stoichiometric proportions of the lutetium, hafnium and titanium precursors were mixed to form the precursor solution.

A precipitant solution of oxalic acid was prepared using an oxalic acid ($C_2O_4H_2$) solution at a concentration of 0.28M. The pH was increased to 9.0 using ammonium hydroxide ($NH_4OH$). An amount of the oxalic acid solution sufficient to provide a 5:1 ratio of $C_2O_4$ to Lu was used, such that the excess OH was sufficient to precipitate HfO.

The precursor solution was titrated into the precipitant solution to form a precipitate. After addition of the precursor, the solution was covered and allowed to stand until the precipitate settled out. The precipitate was filtered from solution and washed with deionized water.

The precipitate wet cake was dried in an oven at approximately 60° C. to remove the water and $NH_4OH$, and the dried cake was calcined in air at 1500° C. for 6 hrs in order to form a polycrystalline ceramic scintillating material having a composition of $Lu_4Hf_3O_{12}$:Ti.

The calcined powder was formed into ceramic scintillator bodies by first die pressing the powder into approximately 12 mm diameter pellets and then cold isostatic pressing the pellets to 30 ksi ($2.07 \times 10^8$ Pa). The pressed pellets were then sintered in air at between 1500° C. and 1600° C. for 3 hrs.

Each sintered sample was then hot isostatic pressed at between 1400° C. and 1600° C. for 1 hr in Argon at 30 ksi to produce a ceramic scintillator body.

It is found that characteristics of the powder scintillating material can affect density and transparency of the resulting scintillator body. Some prior methods aim to produce powders having a uniform distribution of extremely small particles one the order of 1-5 nm in diameter, while other prior methods mix large (e.g., greater than 500 nm) and small (1-5 nm) sizes to attempt to fill any gaps between particles. However, it is found that a powder having substantially spherical particles between 10 nm and 500 nm, with a narrow particle size distribution is advantageous. For instance, a powder scintillating material having substantially spherical particles, where at least ninety percent of the particles have a size between approximately 50 nm and approximately 250 nm, such as approximately 66 nm to approximately 220 nm, can be used to produce a scintillator body having increased density and transparency. For instance, the scintillator body can be characterized by a density of greater than 98%, such as greater than or equal to 99.9%, of theoretical density, In another example, the scintillator body can be characterized by an optical transmittance of greater than fifty percent (50%) total transmission at a scintillator body thickness that stops greater than 98% of x-ray or other radiation at a wavelength of maximum emission.

In accordance with the embodiments described herein, a scintillation device is provided that comprises a free-standing ceramic scintillator body containing a polycrystalline ceramic scintillating material that includes a rare earth element and that is characterized substantially by a cation-deficient perovskite structure. The polycrystalline ceramic scintillating material is characterized by a cation-deficient perovskite structure, in which hexagonal, rather than cubic, stacking of $AO_3$ layers occurs. B-site vacancies cause corner-sharing and face-sharing among the layers, which distorts the cubic lattice structure, as compared to ideal perovskite compositions (e.g., $ABO_3$ compositions).

In a particular embodiment, the polycrystalline ceramic scintillating material includes a rare earth hafnate, such as lutetium hafnate, doped with an activator that includes a second rare earth element or titanium. The relatively high density of lutetium hafnate contributes to its relatively high stopping power as a polycrystalline ceramic scintillating material. That is, the polycrystalline ceramic scintillating material is able to absorb a higher proportion of radiation, such as gamma rays or X-rays, than lower density materials. In addition, lutetium hafnate is compatible with "fast" activators, such as cerium, neodymium, europium, terbium, titanium, and other activators, which cause fast decay of excited valence electrons that emit photons as they move from a higher energy state to a lower energy state. Fast activators are necessary in CT and other medical imaging applications where high numbers of individual pulses are counted despite short scan times.

Ceramic materials can be characterized by lower production costs than other scintillating materials. Nonetheless, it can be difficult to produce ceramic scintillator bodies that are sufficiently transparent to allow visible light emitted by excited valence electrons to pass from the crystal to a photosensor for measurement. This is particularly true where high-density crystals are desired. It has been found that formation of powders that contain rare earth hafnates and dopants, through co-precipitation, enables production of polycrystalline ceramic scintillator bodies using ceramic processes, such as sintering, hot forging, hot pressing, or other ceramic firing processes. Such ceramics exhibit good stopping power and light output.

The illustrations of the embodiments described herein are intended to provide a general understanding of the structure of the various embodiments. The illustrations are not intended to serve as a complete description of all of the elements and features of the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

According to a first aspect, a scintillation device comprises a free-standing ceramic scintillator body that includes a polycrystalline ceramic scintillating material comprising a rare earth element. The polycrystalline ceramic scintillating material is characterized substantially by a cation-deficient perovskite structure. A chemical composition of the polycrystalline ceramic scintillating material can be represented by a general formula of $(RE)_n X_{n-1} O_{3n}$:Ac where RE represents the rare earth element and Ac represents an activator. In one embodiment, n is greater than or equal to four. For example, the chemical composition can be represented by a general formula of $(RE)_4 X_3 O_{12}$:Ac.

In a particular embodiment, RE represents a single rare earth element. The single rare earth element can be a lanthanide element, such as lutetium. In another particular embodiment, X represents a quatrovalent element, such as hafnium. In this embodiment, the chemical composition of the polycrystalline ceramic scintillating material can be represented by a general formula of $(RE)_4 Hf_3 O_{12}$:Ac.

In another embodiment of the first aspect, the activator can include a second rare earth element, such as a lanthanide element. For example, the activator can include cerium, praseodymium, neodymium, europium, terbium, holmium or ytterbium. In another embodiment, the activator can include titanium. The polycrystalline ceramic scintillating material can include less than or equal to approximately ten percent (10%) of the activator based on molar percentage.

According to a second aspect, a radiation detector device includes a photosensor adapted to receive light from a scintillator device, the scintillator device including a free-standing ceramic scintillator body comprising a polycrystalline ceramic scintillating material that includes a rare earth element. The polycrystalline ceramic scintillating material is characterized substantially by a cation-deficient perovskite structure.

In one embodiment, the scintillator body is characterized by a density of greater than ninety-eight percent (98%) of theoretical density. Further, the scintillator body can be characterized by a grain size of from approximately 1 µm to approximately 100 µm. Moreover, the scintillator body can be characterized by an atomic number (eff Z) of greater than approximately 62, such as greater than or equal to 68. In one example, the polycrystalline ceramic scintillating material comprises lutetium hafnate ($Lu_4 Hf_3 O_{12}$).

According to a third aspect, a method of producing a free-standing ceramic scintillator body includes preparing a precursor solution including a rare earth element precursor, a hafnium precursor and an activator (Ac) precursor, obtaining a precipitate from the solution, and calcining the precipitate to obtain a polycrystalline ceramic scintillating material including a rare earth hafnate doped with the activator and having a cation-deficient perovskite structure. In one embodiment, the polycrystalline ceramic scintillating material is a powder.

In another embodiment of the third aspect, the method includes adding a precipitating agent to the solution to obtain the precipitate. For instance, the precipitating agent can include oxalic acid. Alternatively, the method can include adding a combustible fuel to the solution and heating the solution to a heat of combustion to obtain the precipitate. The combustible fuel can include at least one of glycerol, urea, hydrazine, or a hydrocarbon.

In a further embodiment of the third aspect, the rare earth element precursor can include at least one of lutetium chloride or lutetium nitrate. Further, the hafnate precursor can include at least one of hafnium chloride ($HfCl_4$) or hafnium nitrate ($Hf(NO_3)_4$). In an illustrative embodiment, the polycrystalline ceramic scintillating material is represented by a formula $(RE)_4Hf_3O_{12}$:Ac.

In a fourth aspect, a ceramic scintillating powder comprises a polycrystalline ceramic scintillating material comprising a rare earth element, wherein the polycrystalline ceramic scintillating material is characterized substantially by a cation-deficient perovskite structure. In one embodiment of the fourth aspect, the polycrystalline ceramic scintillating material comprises a plurality of substantially spherical particles and wherein at least ninety percent of the particles are characterized by a particle size of from approximately 50 nm to approximately 250 nm. For example, at least ninety percent of the particles can be characterized by a particle size of from approximately 66 nm to approximately 220 nm.

In the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of producing a free-standing ceramic scintillator body, the method comprising:
   preparing a precursor solution including a rare earth element precursor, a hafnium precursor and an activator (Ac) precursor;
   obtaining a precipitate from the solution using a precipitating agent including oxalic acid and ammonium hydroxide;
   calcining the precipitate to obtain a polycrystalline ceramic scintillating material including a rare earth hafnate doped with the activator and having a cation-deficient perovskite structure that includes hexagonal stacking of layers; and
   pressing the polycrystalline ceramic scintillating material; and
   forming a free standing ceramic scintillator body, wherein the free standing ceramic scintillator body has a density of greater than 98% of theoretical density; and an optical transmittance of greater than 50% total transmission at a thickness that stops greater than 98% of x-ray at a wavelength of maximum emission.

2. The method of claim 1, wherein the polycrystalline ceramic scintillating material comprises a plurality of substantially spherical particles, wherein at least ninety percent of the particles are characterized by a particle size of from approximately 50 nm to approximately 250 nm.

3. The method of claim 2, wherein at least ninety percent of the particles are characterized by a particle size of from approximately 66 nm to approximately 220 nm.

4. The method of claim 1, wherein the polycrystalline ceramic scintillating material includes less than or equal to ten percent (10%) of the activator based on molar percentage.

5. The method of claim 1, wherein the rare earth element precursor comprises at least one of lutetium chloride ($LuCl_3$) or lutetium nitrate ($Lu(NO_3)_3$).

6. The method of claim 1, wherein the hafnium precursor comprises at least one of hafnium chloride ($HfCl_4$) or hafnium nitrate ($Hf(NO_3)_4$).

7. The method of claim 1, wherein the polycrystalline ceramic scintillating material is represented by a formula $(RE)_4Hf_3O_{12}$:Ac.

8. The method of claim 1, wherein pressing comprises die pressing, cold isostatic pressing, and hot isostatic pressing.

9. The method of claim 1, wherein pressing comprises die pressing followed by cold isostatic pressing.

10. The method of claim 9, further comprising sintering the pressed scintillating material to form a sintered body.

11. The method of claim 10, further comprising hot isostatic pressing the sintered body to form the free standing ceramic scintillator body.

12. The method of claim 1, further comprising washing the precipitate with deionized water or ethanol.

13. The method of claim 1, further comprising annealing the free standing scintillator body in air.

14. The method of claim 1, wherein the activator comprises at least one of cerium, praseodymium, neodymium, europium, terbium, holmium or ytterbium.

15. The method of claim 1, wherein the activator comprises titanium.

16. The method of claim 1, wherein the free standing ceramic scintillator body has a density of greater than or equal to 99.9% of theoretical density.

* * * * *